United States Patent [19]
Bergh et al.

[11] Patent Number: 6,022,922
[45] Date of Patent: *Feb. 8, 2000

[54] TIRE WITH SILICA REINFORCED TREAD

[75] Inventors: Jean Bergh, Vianden; Marc Junio, Steinsel; Jean-Claude Joseph Marie Kihn, Hollenfels; Tom Dominique Linster, Gilsdorf, all of Luxembourg; Jean-Paul Lambotte, Arlon, Belgium

[73] Assignee: The Goodyear Tire & Rubber Company, Akron, Ohio

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/889,034

[22] Filed: Jul. 7, 1997

Related U.S. Application Data

[63] Continuation of application No. 08/589,741, Jan. 22, 1996, abandoned, which is a continuation of application No. 08/124,152, Sep. 20, 1993, abandoned.

[51] Int. Cl.[7] .................. B60C 1/00; C08K 3/36
[52] U.S. Cl. ................ 524/492; 152/905; 525/237
[58] Field of Search ................ 152/209 R, 450, 152/905, 209.1, 209.5; 525/236, 237; 524/492, 493, 495

[56] References Cited

U.S. PATENT DOCUMENTS

| | | | |
|---|---|---|---|
| 3,873,489 | 3/1975 | Thurn et al. | 152/209 R |
| 5,047,483 | 9/1991 | Halasa et al. | 525/237 |
| 5,272,220 | 12/1993 | Rodgers et al. | 525/332.3 |
| 5,336,730 | 8/1994 | Sandstrom et al. | 152/209 R |
| 5,447,971 | 9/1995 | Bergh et al. | 152/209 R |

*Primary Examiner*—Geoffrey L. Knable
*Attorney, Agent, or Firm*—Henry C Young, Jr.

[57] ABSTRACT

The invention relates to a tire with a tread which is reinforced with a quantitative amount of silica, including a silica coupler, where the tread rubbers are of a blend comprised of styrene/isoprene/butadiene terpolymer rubber and cis 1,4-polybutadiene rubber or styrene/isoprene/butadiene terpolymer rubber, cis 1,4-polybutadiene rubber and isoprene/butadiene copolymer rubber. Optionally, the rubber blend can contain a minor amount of cis 1,4-polyisoprene natural rubber.

6 Claims, No Drawings

TIRE WITH SILICA REINFORCED TREAD

This is a Continuation of application Ser. No. 08/589,741, filed on Jan. 22, 1996 now abandoned, which was a continuation of application Ser. No. 08/124,152 filed on Sep. 20, 1993, now abandoned.

FIELD

This invention relates to a tire having a rubber tread which is reinforced with silica. In one aspect, the tread is comprised of a specified multiple component rubber blend of a styrene/isoprene/butadiene rubber together with cis 1,4-polybutadiene rubber and at least one of isoprene/butadiene copolymer rubber and natural cis 1,4-polyisoprene rubber which is reinforced with a quantitative amount of silica or a combination of silica and carbon black.

BACKGROUND

Pneumatic rubber tires are conventionally prepared with a rubber tread which can be a blend of various rubbers which is typically reinforced with carbon black.

In one aspect, rubbers are evaluated, selected and blended for a purpose of achieving desired tire tread properties and particularly a balance of tire tread characteristic properties, mainly, rolling resistance, traction and wear.

For various applications utilizing rubber including applications such as tires and particularly tire treads, sulfur cured rubber is utilized which contains substantial amounts of reinforcing filler(s). Carbon black is commonly used for such purpose and normally provides or enhances good physical properties for the sulfur cured rubber. Particulate silica is also sometimes used for such purpose, particularly when the silica is used in conjunction with a coupling agent. In some cases, a combination of silica and carbon black is utilized for reinforcing fillers for various rubber products, including treads for tires.

It is important to appreciate that, conventionally, carbon black is considered to be a more effective reinforcing filler for rubber tire treads than silica if the silica is used without a coupling agent.

Indeed, at least as compared to carbon black, there tends to be a lack of, or at least an insufficient degree of, physical and/or chemical bonding between the silica particles and the rubber elastomers to enable the silica to become a reinforcing filler for the rubber for most purposes, including tire treads, if the silica is used without a coupler. While various treatments and procedures have been devised to overcome such deficiencies, compounds capable of reacting with both the silica surface and the rubber elastomer molecule, generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are generally composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself. Usually the rubber reactive component of the coupler is temperature sensitive and tends to combine with the rubber during the final and higher temperature sulfur vulcanization stage and, thus, subsequent to the rubber/silica/coupler mixing stage and, therefore, after the silane group of the coupler has combined with the silica. However, partly because of typical temperature sensitivity of the coupler, some degree of combination, or bonding, may occur between the rubber-reactive component of the coupler and the rubber during an initial rubber/silica/coupler mixing stages and, thus, prior to a subsequent vulcanization stage.

The rubber-reactive group component of the coupler may be, for example, one or more of groups such as mercapto, amino, vinyl, epoxy, and sulfur groups, preferably a sulfur or mercapto moiety and more preferably sulfur.

Numerous coupling agents are taught for use in combining silica and rubber such as, for example, silane coupling agents containing a polysulfide component, or structure, such as bis-(3-triethoxysilylpropyl)tetrasulfide.

For silica reinforced tire treads, U.S. Pat. No. 5,066,721, in its Comparative Test Example 1 in Table 3 (column 15), discloses the use of solution polymerization prepared SBR containing 50 parts silica for a tire tread. Table 4 (column 17) illustrates the tire preparation. EPO application No. 501227-A also discloses the use of a solution polymerization prepared SBR which is silica reinforced and in which is preferenced over an emulsion polymerization prepared SBR. U.S. Pat. No. 4,519,430 discloses a silica rich tire tread which contains solution or emulsion SBR, optionally with polybutadiene rubber and/or polyisoprene rubber together with a mixture of silica and carbon black, with silica being required to be a major component of the silica/carbon black reinforcing filler. U.S. Pat. No. 5,227,425 discloses a sulfur vulcanizable rubber composition for tire treads composed of, for example, solution polymerization prepared SBR containing a filler of which a majority portion is silica. EPO application No. 447,066 discloses a rubber composition for a tire tread composed of silica and silane coupling agent with rubbers composed of polybutadiene or styrene/butadiene copolymer prepared with an organic alkali metal initiator and which may also contain other specified rubbers.

Other U.S. patents relating to silicas and silica reinforced tire treads include U.S. Pat. Nos. 3,451,458; 3,664,403; 3,768,537; 3,884,285; 3,938,574; 4,482,663; 4,590,052; 5,089,554 and British 1,424,503.

Styrene/isoprene/butadiene terpolymer rubbers have been disclosed for use in tire treads. For example, U.S. Pat. No. 5,159,020 discloses such a terpolymer rubber (SIBR) and use thereof in a tire tread composition. It is disclosed therein that such tire tread can be composed of a blend of the SIBR and at least one other rubber such as natural rubber, polybutadiene rubber, styrene/butadiene copolymer rubber, 3,4-polyisoprene rubber and medium vinyl polybutadiene rubber. It is disclosed therein that the blend can contain silicas.

SUMMARY AND PRACTICE OF THE INVENTION

In accordance with this invention, a pneumatic tire is provided having a tread comprised of, based on 100 parts by weight rubber, (A) diene-based elastomers comprised of (i)

about 60 to about 90, preferably about 60 to about 85, phr of a styrene/isoprene/butadiene terpolymer rubber characterized by having a Tg in a range of about −25° C. to about −50° C., and by being composed of about 6 to about 40 weight percent bound styrene, about 20 to about 65 weight percent bound isoprene and about 10 to about 50 weight percent bound butadiene, (ii) about 10 to about 40 phr of a cis 1,4-polybutadiene rubber, and (iii) up to about 60, preferably in a range of about 5 to about 35, phr of isoprene/butadiene copolymer rubber having a Tg in a range of about −20° C. to about −50° C. and containing about 30 to about 70, preferably about 40 to about 60, weight percent isoprene, (B) about 50 to about 110, preferably about 60 to about 85, phr particulate silica, (C) at least one silica coupler having a moiety reactive with silicon dioxide and a moiety reactive with said elastomers, in a weight ratio of silica to coupler of about 7/1 to about 15/1, and (D) about 0 to about 50 phr carbon black, wherein the weight ratio of silica to carbon black, if carbon black is used, is at least 1/1 and preferably at least 4/1 and where the total of silica and carbon black, if used, is about 60 to about 120, preferably about 70 to about 90 phr.

Thus, in one aspect of the invention, a pneumatic tire is provided having such tread where said rubbers are comprised of, based on 100 parts by weight rubber, (A) diene-based elastomers comprised of (i) about 60 to about 90, preferably about 60 to about 85, phr of the styrene/isoprene/butadiene terpolymer rubber and (ii) about 10 to about 40 phr of a cis 1,4-polybutadiene rubber.

In another aspect of the invention, a pneumatic tire is provided having such tread where said rubbers are comprised of, based on 100 parts by weight rubber, (A) diene-based elastomers comprised of (i) about 60 to about 90, preferably about 60 to about 85, phr of the styrene/isoprene/butadiene terpolymer rubber, and (ii) about 10 to about 40 phr of a cis 1,4-polybutadiene rubber, and (iii) about 10 to about 60, preferably about 10 to about 35, phr of a isoprene/butadiene copolymer rubber having a Tg in a range of about −20° C. to about −50° C. and containing about 40 to about 60 weight percent isoprene.

If desired, up to 15, preferably about 5 to about 15, phr of cis 1,4-polyisoprene rubber, preferably natural rubber, can be added to the rubber blends for the tire tread of this invention.

The term "phr" as used herein, and according to conventional practice, refers to "parts of a respective material per 100 parts by weight of rubber".

The di or tri rubber blend, or possibly a tetra rubber blend, where cis 1,4-polyisoprene natural rubber is used, although the aforesaid di and tri rubber blends are preferred for the tire tread, is an important feature of the invention designed to enhance properties of a tire tread containing a substantial amount of silica reinforcement.

The styrene/isoprene/butadiene terpolymer rubber (SIBR) is prepared by solution polymerization. A suitable SIBR terpolymer rubber is disclosed, for example, in U.S. Pat. No. 5,159,020 which is specifically incorporated herein by reference.

The Tg for the SIBR, and for the isoprene/butadiene copolymer rubber, refers to the glass transition temperature which can conveniently be determined by a differential scanning calorimeter at a heating rate of 10° C. per minute.

The utilization of an organic solvent solution polymerization prepared SIBR terpolymer rubber instead of an organic solvent solution polymerization prepared styrene/butadiene copolymer rubber is considered to be significant and beneficial, in one aspect, because it is considered herein that the SIBR provides a better trade-off or compromise in wet skid and rolling resistance for the tire tread. This means that it is considered herein that improvements in a tire tread's wet skid resistance and in its rolling resistance are more readily obtainable with the utilization of the said SIBR terpolymer rubber than with an organic solvent solution polymerization prepared styrene/butadiene copolymer rubber. This is considered herein to be an advantage, or beneficial, insofar as a rubber tire tread is concerned, particularly where it is desired to reduce a tire tread's rolling resistance (improve the rolling resistance) without reducing its wet skid resistance.

The isoprene/butadiene copolymer rubber (IBR) is considered beneficial, in one aspect, to aid in reducing the tire's rolling resistance as evidenced, on a predictability basis by observing a cured samples thereof as exhibiting a suitable lower hysteresis as evidenced by rebound physical property values.

The IBR may be conveniently prepared, for example, by solution polymerization of isoprene and 1,3-butadiene under suitable polymerization conditions to achieve a desired Tg range, in its uncured state, of about −20° C. to about −50° C.

The cis 1,4-polybutadiene rubber (BR) is considered to be beneficial, in one aspect, to enhance the tire tread's wear, or treadwear.

Such BR can be prepared, for example, by organic solution polymerization of 1,3-butadiene.

The BR may be conventionally characterized, for example, by having at least a 90% cis 1,4-content.

The cis 1,4-polyisoprene natural rubber is well known to those having skill in the rubber art.

Thus, in the practice of this invention, a balanced di or tri rubber blend, or optionally a tetra rubber blend, where cis 1,4-polyisoprene rubber is used, although the aforesaid di and tri rubber blends are preferred for the tire tread, is provided which is based upon the SIBR terpolymer rubber backbone and a quantitative silica reinforcement which, in turn, relies on a silica coupler for the silica's reinforcing effect for the rubber blend.

Also, in further accordance with this invention, the tread rubber blend requires the presence of both solution polymerization prepared rubber (SIBR) and the cis 1,4-polybutadiene rubber(s). The utilization and presence of the said SIBR is considered herein to be important to enhance both wet skid and rolling resistance for the tire tread, and the polybutadiene is considered herein to be important to enhance treadwear for the tire tread.

In another aspect, such rubber tread also may contain carbon black a weight ratio of silica to carbon black is at least about 1.5/1, optionally at least about 4/1 and for some applications at least about 10/1.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

The BET surface area of the silica pigment, as measured using nitrogen gas, is preferably in the range of about 100 to about 250, preferably about 120 to about 180, square meters per gram. The BET method of measuring surface area is described in the *Journal of the American Chemical Society*, Volume 60, page 304 (1930).

The silica also typically has a dibutylphthalate (DBP) absorption value in a range of about 200 to about 400, and usually about 250 to about 300.

The silica might be expected to have an average ultimate particle size, for example, in a range of about 0.01 to about 0.05 micron as determined by the electron microscope, although the silica particles may be even smaller in size.

Various commercially available silicas may be considered for use in this invention such as, for example, only and with limitation, silicas commercially available from PPG Industries under the Hi-Sil trademark such as, for example, those with designations 210, 243, etc; silicas available from Rhone-Poulenc, with designations of Z1165MP and Z165GR and silicas available from Degussa AG with designations VN2 and VN3, etc. The Rhone-Poulenc Z1165MP silica is a preferred silica which is reportedly characterized by having a BET surface area of about 160–170 and by a DBP value of about 250–290 and by having a substantially spherical shape.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typically additions of carbon black, for this invention, if used, are hereinbefore set forth. Typical amounts of tackifier resins, if used, comprise about 0 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. Retarders are also used to control the rate of vulcanization. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary or and a secondary accelerator might be used, with the secondary accelerator being used in amounts of about 0.05 to about 3 phr, for example, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with a coupling agent.

The presence and relative amounts of the above additives are not considered to be an aspect of the present invention which is more primarily directed to the utilization of specified blends of rubbers in tire treads, in combination with silica and silica coupler.

The tire can be built, shaped, molded and cured by various methods which will be readily apparent to those having skill in such art.

The invention may be better understood by reference to the following examples in which the parts and percentages are by weight unless otherwise indicated.

EXAMPLE I

Two rubber blend compositions (compounded rubber) were prepared as a blend of styrene/isoprene/butadiene terpolymer rubber (SIBR) and cis 1,4-polybutadiene (BR), referred to herein as Sample X and of a blend of SIBR, BR and isoprene/butadiene copolymer rubber (IBR) referred to herein as Sample Y.

The rubber compositions of Samples X and Y were prepared by mixing the ingredients in several stages, namely, three non-productive stages (without the curatives) and a productive stage (for the curatives), then the resulting composition was cured under conditions of elevated temperature and pressure.

For the non-productive mixing stages, exclusive of the accelerator(s) and sulfur curatives which are mixed (added) in the final, productive mixing stage, the rubbers are added in the first stage and about 60 and about 50 percent, for Samples X and Y, respectively, of each of the other ingredients, are mixed in the first non-productive mixing stage to a temperature of about 150° C. to about 180° C. for about 4 minutes; about 25 and 50 percent, for Samples X and Y, respectively, of the other ingredients are mixed (added) in the second non-productive mixing stage to a temperature of about 140° C. to about 170° C. for about 2.5 to 3 minutes and about 18 and zero percent, for Samples X and Y, respectively, of the ingredients are mixed (added) in the third non-productive mixing stage to a temperature of about 130° C. to about 160° C. for about 3 minutes, all in a Banbury type rubber mixer. To the resulting rubber composition (mixture) was then mixed the curatives in a Banbury type mixer, namely, the accelerator(s) and sulfur to a temperature of about 120° C. for about 3 minutes. The rubber was then vulcanized at a temperature of about 150° C. for about 18 minutes. The mixtures are batched off, or dumped, from the mixer at the completion of each mixing step and cooled to a temperature of about 30° C. to about 50° C. before proceeding to the next mixing step.

The rubber composition was comprised of the ingredients illustrated in Table 1. Table 2 illustrates properties of the cured rubber composition.

TABLE 1

| Sample # | X | Y |
|---|---|---|
| Non-Productive Mix Stages | | |
| SIBR | 70 | 50 |
| BR[1] | 30 | 25 |
| IBR[2] | 0 | 25 |
| Processing Oil[3] | 26.3 | 18.8 |
| Zinc Oxide | 2.5 | 2.5 |
| Fatty Acid | 3 | 3 |
| Antioxidant[4] | 3 | 3 |
| Silica[5] | 80 | 65 |
| Coupling Agent[6] | 12.8 | 10.4 |
| Productive Mix Stage | | |
| Sulfur | 1.40 | 1.40 |
| Sulfenamide and Guanidine Type Accelerators | 3.5 | 3.5 |

The SIBR having a Tg of about −32° C., about 25 percent bound styrene, about 50 percent bound isoprene and about 25 bound butadiene obtained from The Goodyear Tire & Rubber Company and containing 25 percent rubber processing oil.

1) Cis 1,4-polybutadiene rubber obtained as Budene® 1254 from The Goodyear Tire & Rubber Company.

2) Isoprene/butadiene copolymer rubber having an isoprene content of about 50 percent and a Tg of about 43° C. obtained from The Goodyear Tire & Rubber Company.

3) Rubber processing oil as being 17.5 parts contained in the SIBR of Sample X and 12.5 parts contained in the SIBR of Sample Y, wherein the SIBR is reported in the above table on a dry weight (without the oil) basis, wherein, in addition, 9 parts and 6.4 parts of additional rubber processing oil is added to Samples X and Y, respectively.

4) Of the alkylaryl paraphenylene diamine type.

5) A silica obtained as Z1165MP from the Rhone-Poulenc company, and reportedly, having a BET surface area of about 165 and a DBP absorption value of about 260–280.

6) obtained as bis-3-triethoxysilylpropyl) tetrasulfide (50% active) commercially available as X50S from Degussa as a 50/50 blend of the tetrasulfide with N330 carbon black (thus, considered 50% active).

TABLE 2

| Sample # | X | Y | Z Control |
|---|---|---|---|
| Rheometer (150° C.) | | | |
| Max. Torque dN · m | 37.8 | 42.6 | 40.2 |
| Min. Torque dN · m | 12.8 | 12.2 | 12.2 |
| $T_{90}$, minutes | 12.1 | 13.6 | 15.0 |
| $T_{25}$, minutes | 5.2 | 8.4 | 7.5 |
| Stress-Strain | | | |
| Tensile Strength, MPa | 16.5 | 16.9 | 16.2 |
| Elongation at Break, % | 575 | 520 | 500 |
| 100% Modulus, MPa | 1.7 | 2.2 | 2.0 |
| 300% Modulus, MPA | 8.0 | 9.1 | 9.2 |
| Rebound | | | |
| 100° C., (%) | 58 | 65 | 52 |
| 23° C., (%) | 34 | 37 | 28 |
| Hardness (Shore A) | | | |
| 23° C. | 62 | 67 | 66 |
| Dynamic Mechanical Properties | | | |
| Tan Delta at 50° C. | 0.17 | 0.13 | 0.25 |
| Tan Delta at −20° C. | 0.6 | 0.58 | 0.39 |

These properties of the rubber compositions demonstrate that anticipated rolling resistance and traction for a tire with tread of Sample X or of Sample Y would be superior to those of a Sample Z, which is considered a control as referenced in the following Example II.

EXAMPLE II

Pneumatic rubber tires are prepared of size 185/65R15 steel belted radial ply tires, which have sulfur cured rubber treads composed of the rubber composition of the type illustrated as Samples X and Y of Example I.

Tire Z had a tread of a blend of natural rubber and solution polymers and reinforced with about 60 phr carbon black and which contained about 10 phr silica. It is used as a comparative control.

The tires were tested with the results shown in Table 3, with the values compared to those of the control which have been normalized to values of 100.

TABLE 3

| Tire Properties | X | Y | Z Control |
|---|---|---|---|
| Rolling Resistance | 107 | 116 | 100 |
| Wet Skid | 111 | 107 | 100 |
| Wear | 105 | 95 | 100 |

Higher above reported values for the rolling resistance for tires X and Y, as compared to tire Z, above indicates an improved, or lower, rolling resistance for the tire and, thus, an indication of improved fuel economy for the vehicle.

Higher above reported wet skid values for tires X and Y, as compared to tire Z, indicates a greater tire tread traction and, thus, a greater resistance to skidding under wet conditions.

The higher wear value reported for tire X, as compared to tire Z, indicates a lower treadwear, thus, indicating a greater predicted tread life for tire X.

Thus, these Examples demonstrate that the aforesaid rolling resistance and wet skid resistance properties for the tire X and tire Y are significantly improved over the values for the control tire Z.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a tread comprised of, based on 100 parts by weight rubber, (A) diene-based elastomers consisting essentially of (i) about 60 to about 85 phr of solvent solution prepared styrene/isoprene/butadiene terpolymer rubber characterized by having a Tg in a range of about −25° C. to about −50° C. and by being composed of about 6 to about 40 weight percent bound styrene, about 20 to about 65 weight percent bound isoprene and about 10 to about 50 weight percent bound butadiene, (ii) about 10 to about 40 phr of cis 1,4-polybutadiene rubber, and (iii) 5 to about 35 phr isoprene/butadiene copolymer rubber having a Tg in a range of about −20° C. to about −50° C. and containing about 30 to about 70 weight percent isoprene, (B) about 50 to about 110 phr particulate, precipitated silica, (C) at least one silica coupler having a moiety reactive with the surface of said silica and a moiety reactive with said elastomers, in a weight ratio of silica to coupler of about 7/1 to about 15/1, and (D) up to about 50 phr carbon black, wherein the weight ratio of silica to carbon black is at least 1/1 where the total of silica and carbon black is about 60 to about 120 phr.

2. The tire of claim 1 in which said tread also contains about 5 to about 15 phr of cis 1,4-polyisoprene rubber.

3. The tire of claim 1 where said silica is characterized by having a BET surface area in a range of about 100 to about 200 and a DBP absorption value in a range of about 200 to about 400.

4. The tire of claim 1 where, in the tread, the weight ratio of silica to carbon black is at least 10/1.

5. The tire of claim 1 where the said styrene/isoprene/butadiene copolymer rubber is characterized, in its uncured state, by having a single Tg in a range of about −30° C. to about −40° C.

6. The tire of claim 1 where the said coupler is a bis-3-(triethoxysilylpropyl)tetrasulfide.

* * * * *